US009838335B2

(12) United States Patent
Koike

(10) Patent No.: US 9,838,335 B2
(45) Date of Patent: Dec. 5, 2017

(54) SWITCHING HUB AND COMMUNICATION NETWORK

(71) Applicant: DENSO CORPORATION, Kariya, Aichi-pref. (JP)

(72) Inventor: Tomoyuki Koike, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/075,753

(22) Filed: Mar. 21, 2016

(65) Prior Publication Data
US 2016/0301545 A1    Oct. 13, 2016

(30) Foreign Application Priority Data

Apr. 8, 2015 (JP) .................................. 2015-79372

(51) Int. Cl.
*H04L 12/933* (2013.01)

(52) U.S. Cl.
CPC .............. *H04L 49/10* (2013.01); *H04L 49/15* (2013.01)

(58) Field of Classification Search
CPC ................................. H04L 49/10; H04L 49/15
See application file for complete search history.

(56) References Cited

U.S. PATENT DOCUMENTS

| 8,098,571 | B2 * | 1/2012 | Santoso | ................. | H04L 45/00 370/216 |
| 9,565,487 | B2 * | 2/2017 | Beshai | ............... | H04Q 11/0005 |
| 9,716,672 | B2 * | 7/2017 | Vobbilisetty | ............ | H04L 49/70 |
| 2004/0001513 | A1 * | 1/2004 | Major | ................. | H04L 12/4641 370/469 |
| 2006/0023726 | A1 * | 2/2006 | Chung | .................... | H04L 45/60 370/398 |
| 2010/0313256 | A1 * | 12/2010 | Sekiguchi | ............. | H04L 63/102 726/7 |
| 2011/0131361 | A1 * | 6/2011 | Itakura | ................ | G06F 11/2033 710/313 |
| 2011/0292788 | A1 | 12/2011 | Tsuchiya | | |
| 2012/0275301 | A1 * | 11/2012 | Xiong | ................... | H04L 49/357 370/230 |
| 2012/0307836 | A1 | 12/2012 | Ishigooka et al. | | |
| 2014/0269720 | A1 * | 9/2014 | Srinivasan | .............. | H04L 49/25 370/392 |

FOREIGN PATENT DOCUMENTS

JP    2008-099014 A    4/2008
JP    2014-146997 A    8/2014

* cited by examiner

*Primary Examiner* — Asad Nawaz
*Assistant Examiner* — Saad A Waqas
(74) *Attorney, Agent, or Firm* — Posz Law Group, PLC

(57) ABSTRACT

Switching hubs includes switches in a hierarchy type communication network used in a vehicle, the switches respectively include a first section storing a received Identification (ID) number received by one port in a memory as an identifier of the respective switches, and a second section sending a port-specific identifier from each of the other ports in the respective switches by generating the port-specific identifier as a combination of a port number and the received ID number according to a preset rule, thereby enabling a dynamic assignment of an identifier to each of the switches in the communication network.

4 Claims, 4 Drawing Sheets

FIG. 4

```
           ID TABLE

SWITCH 11 : 0
    SWITCH 12 : 1
    SWITCH 13 : 2
    SWITCH 14 : 3
    SWITCH 15 : 22
    SWITCH 16 : 221
    SWITCH 17 : 222
```

SWITCHING HUB AND COMMUNICATION NETWORK

CROSS REFERENCE TO RELATED APPLICATION

The present application is based on and claims the benefit of priority of Japanese Patent Application No. 2015-079372, filed on Apr. 8, 2015, the disclosure of which is incorporated herein by reference.

TECHNICAL FIELD

The present disclosure generally relates to a switching hub that constitutes a hierarchy type communication network used in a vehicle.

BACKGROUND INFORMATION

In the Ethernet communication network used in a vehicle (Ethernet: a registered trademark), a layer-2 switching hub used as a network switch (i.e., may simply be designated as a "switch" in the following) does not have a Media Access Control (MAC) address nor an Internet Protocol (IP) address, in general. Therefore, it is difficult to identify an individual switching hub.

Further, unless each of switching hubs is individually identifiable, a master device of the communication network cannot instruct each of the switching hubs to perform a certain/desired process (e.g., cannot instruct an individual switch to overwrite a configuration setting) to read fault information.

To resolve such a problem, a layer-3 switch may be used, for example (i.e., use of a switching hub having a static Identification (ID) address), which leads to a complicated ID number management system, and also leads to an increase of the management cost. Further, the layer-3 switch itself is more expensive, compared with the layer-2 switch (i.e., a switching hub of layer-2).

For example, a technology for distributing frame data by using plural switching nodes is described in a patent document, JP 2011-249979 A (patent document 1).

In the technology of the patent document 1, a dynamic assignment of an identifier to a switching hub that does not have any identifier is not performable. Therefore, sending an instruction to each of the individual switching hubs is not possible.

SUMMARY

It is an object of the present disclosure to provide a technique that enables a dynamic assignment of an identifier to a network switch, or a switching hub, to which an identifier is dynamically assignable when a communication network in a vehicle is formed as a hierarchical type by using such a network switch (i.e., when the communication network in a vehicle has a hierarchical topology/a tree topology).

In one aspect of the present disclosure, a switching hub serves as a component of a hierarchical communication network in a vehicle. The switching hub includes a switch that includes a memory storing an identification (ID) number as an identifier of the switch, a specific port, and ports in the switch other than the specific port, a first section, and a second section.

The first section stores, in the memory, the ID number that is received by the specific port of the switching hub as the identifier of the switching hub.

The second section sends a port-specific ID number from each of the ports in the switch other than the specific port corresponding to the post-specific ID number, to ports in other switches in the switching hub. The port-specific ID number is generated as a combination of a port number corresponding to each of the ports in the switch other than the specific port, and the received ID number according to a preset rule.

When a hierarchy type communication network is formed by using such a switching hub, other ports of an upper hierarchy switching hub other than the specific port may be respectively connected to the specific port of each of a lower hierarchy switching hub. In such manner, by providing an only one seed ID number to the specific port of the switching hub in an upper-most hierarchy of the communication network, a unique ID number is stored in (i.e., assigned to) each of the switching hubs in the communication network.

Therefore, a unique ID number is dynamically assignable as an identifier to each of the switching hubs that constitute the communication network. Thus, a master device in the communication network can instruct an execution of a certain process to each of the individual switching hubs by using the stored ID number stored in the respective switching hubs, because each of the ID number is generated in a predictable manner according to the preset rule.

The number in the parenthesis of the claims represents a relationship between the claim element and the device in the embodiment, thereby not limiting the technical scope of the claim element in any manner.

BRIEF DESCRIPTION OF THE DRAWINGS

Objects, features, and advantages of the present disclosure will become more apparent from the following detailed description made with reference to the accompanying drawings, in which:

FIG. 4 is an illustration of an ID table.

DETAILED DESCRIPTION

The communication network to which the present disclosure is applied is described in the following as an embodiment of the present disclosure.

[Configuration of the Present Embodiment]

Figure 1:
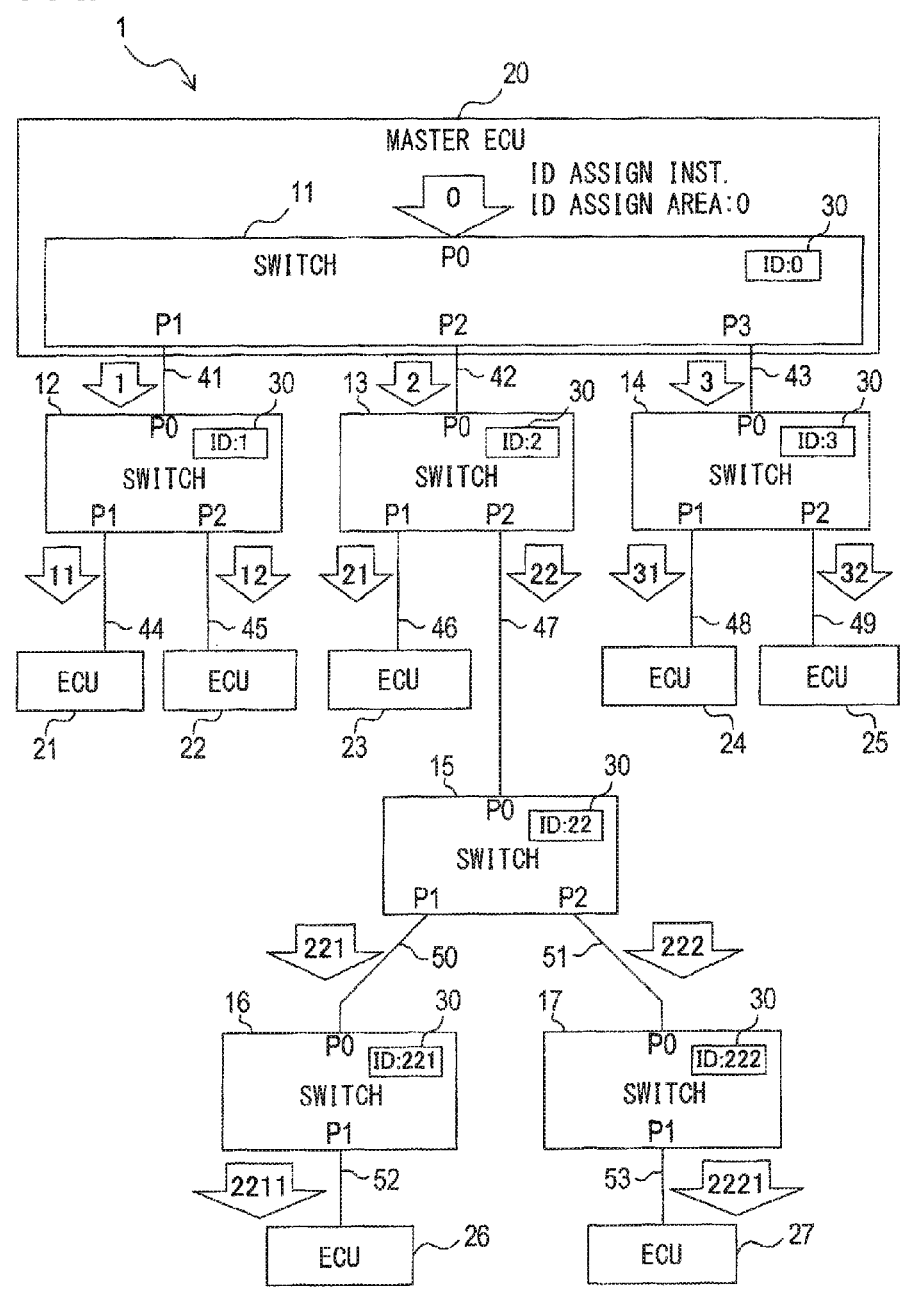
FIG. 1 is a schematic diagram of a communication network in an embodiment of the present disclosure.

A communication network 1 of the present embodiment shown in FIG. 1 is an Ethernet network of a hierarchical type disposed in a vehicle (e.g., in a passenger vehicle), and constitutes a communication system in the vehicle.

As shown in FIG. 1, the communication network 1 is provided with plural switching hubs (switches) 12-17, and plural Electronic Control Units (ECUs) 20-27.

Each of ECUs 20-27 is provided with a function of a microcomputer (not illustrated) having Central Processing Unit (CPU), Read Only Memory (ROM), Random Access Memory (RAM), etc. Further, ECU 20 among ECUs 20-27 is a master ECU in the communication network 1. The master ECU 20 is provided with a switch 11. The master ECU 20 is a central gateway, for example.

The switches 11-17 are respectively layer-2 switches of the Ethernet switch, and perform communication using an Ethernet standard. Therefore, the switches 11-17 identify a destination device by using a Media Access Control (MAC) Address contained in the data, and relay the data to a communication line to which the destination device is connected.

Further, each of the switches 11-17 is provided with a memory 30 for storing (i.e., memorizing) an Identification (ID) number that serves as an identifier of the respective switches 11-17, and a processor (not illustrated) that consists of an Integrated Circuit (IC) and/or a microcomputer, etc., which manage an operation of the switch. Although the memory 30 is a volatile RAM in the present embodiment, for example, it may be a rewritable, non-volatile storage/memory.

In the communication network 1, all devices (e.g., the switches and ECUS) making up the communication network 1 perform data exchange according to the Ethernet standard. Each of the devices making up the hierarchical Ethernet network is connected to form a tree formation, with the master ECU 20 put in an uppermost hierarchy (i.e., in a top/first hierarchy) of the devices.

That is, a port P1 of the switch 11 in the master ECU 20 is connected to a port P0 of the switch 12 via a communication line 41. Further, a port P2 of the switch 11 is connected to a port P0 of the switch 13 via a communication line 42, and a port P3 of the switch 11 is connected to a port P0 of the switch 14 via a communication line 43.

A port P1 and a port P2 of the switch 12 are connected to ECUs 21 and 22 via communication lines 44 and 45, respectively, and a port P1 and a port P2 of the switch 14 are connected to ECUS 24 and 25 via communication lines 48 and 49, respectively.

A port P1 of the switch 13 is connected to ECU 23 via a communication line 46, and a port P2 of the switch 13 is connected to a port P0 of the switch 15 via a communication line 47.

A port P1 of the switch 15 is connected to a port P0 of the switch 16 via a communication line 50, and a port P2 of the switch 15 is connected to a port P0 of the switch 17 via a communication line 51.

A port P1 of the switch 16 is connected to ECU 26 via a communication line 52, and a port P1 of the switch 17 is connected to ECU 27 via a communication line 53.

Thus, the switches 12-14 are second hierarchy devices, the switch 15 and ECUS 21-25 are third hierarchy devices, the switches 16 and 17 are fourth hierarchy devices, and ECUS 26 and 27 are fifth hierarchy devices.

[Process of the Present Embodiment]

In the communication network 1 of the above-described configuration, each of the switches 11-17 stores (i.e., memorizes) an ID number as an own identifier dynamically.

Figure 2:
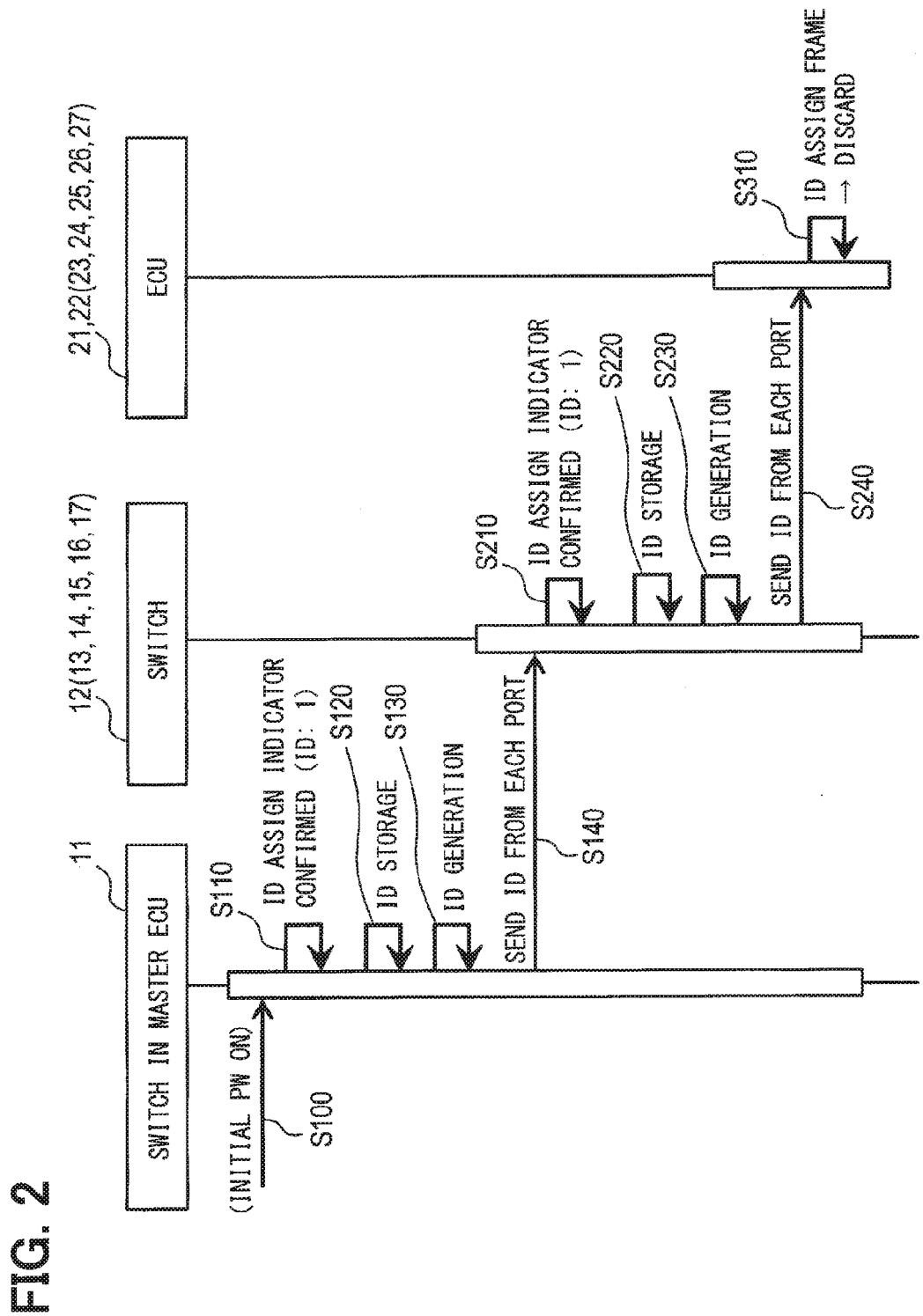
FIG. 2 is a ladder chart of an operation in each of a device in the communication network.

The procedure of such an ID number storage process is described according to FIG. 2.

Although the following description of FIG. 2 focuses on an operation of the switches 11 and 12, the operation of the other switches 13-17 is the same as the described operation of the switches 11 and 12.

Further, even though the operation of ECUS 21 and 22 is described, the operation of other ECUS 23-27 is the same as the described operation of ECUs 21 and 22.

When, for example, a starting condition is fulfilled (e.g., an ignition switch of the vehicle is turned ON), a power supply to each of the plural devices of the communication network 1 is started, and each of the plural devices starts to operate.

Then, after the master ECU 20 is started by receiving a power supply, the master ECU 20 sends an Ethernet frame, which includes an ID assign instruction and an ID number (i.e., designated an ID assign frame, hereinafter), to the port P0 of the switch 11 in the master ECU 20 (S100).

Figure 3:
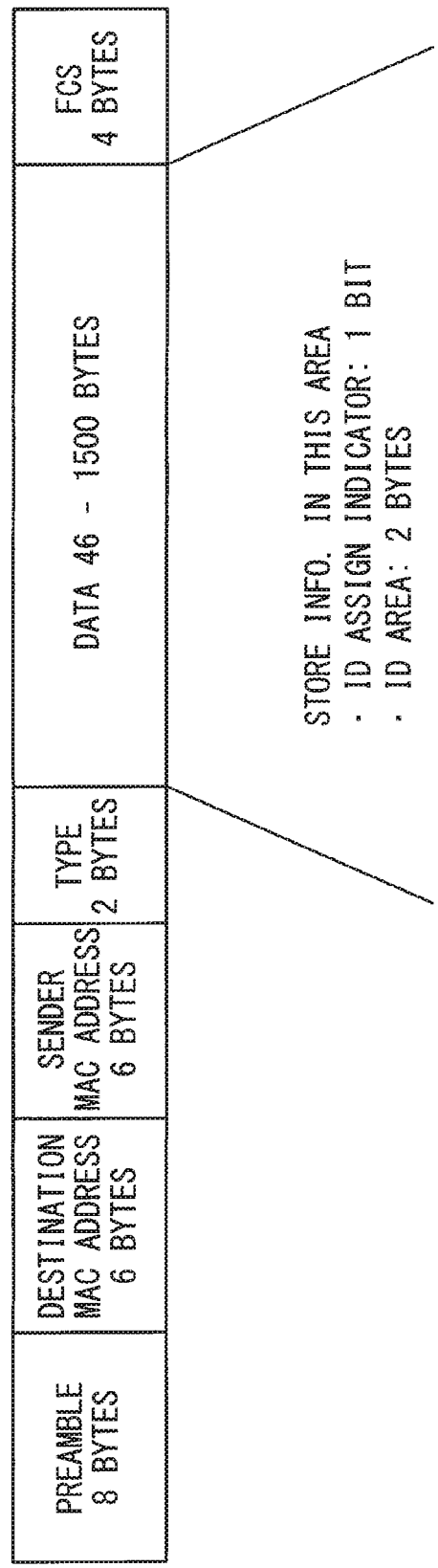
FIG. 3 is a structure diagram of an Ethernet frame.

Here, the Ethernet frame comprises various areas (i.e., a preamble, a destination MAC address, a sender MAC Address, a type, data, and Frame Check Sequence (FCS)), as shown, for example, in FIG. 3.

Among those areas, the data area includes (i) an ID assign indicator, indicating that this Ethernet frame is an ID assign frame, for an assignment of an ID number to a switch, and (ii) an ID area, storing an ID number to be assigned to the switch.

For example, the ID assign indicator is a 1 bit, and the ID assign indicator having a value "1" means that the ID assign indicator is an ID assign instruction. Therefore, the Ethernet frame having the ID assign indicator of "1" means that the frame is an ID assign frame.

Further, for example, 2 bytes are reserved as the ID area.

Further, in the master ECU 20, "0" is set as a starting value of the ID number, which starts an ID number assignment scheme as a seed ID number as a value in the ID area, in the ID assign frame that is inputted to the port P0 of the switch 11. In the present embodiment, the ID number is a decimal number.

The switch 11 checks (i.e., examines and confirms) the ID assign indicator in the Ethernet frame received by the port P0 (S110), and when the ID assign indicator is "1", the switch 11 performs a first operation and a second operation.

<First Operation>

The switch 11 memorizes the ID number included in the Ethernet frame (in this case, in the ID assign frame) received by the port P0 (i.e., a specific port) as an own ID number in the memory 30 of the switch 11 (S120).

<Second Operation>

The switch 11 then generates an ID number to be sent from the other ports other than the port P0 (i.e., from ports P1 to P3 in the switch 11), by combining (i) a port number or decimal part of the port number (e.g., "P1" or "1") to be used to send the generated ID number (i.e., a port-specific ID number) and (ii) the received ID number according to a preset rule (S130). The port number may be represented as a port Pn, where the number "n" is a decimal number just like the ID number.

Further, for example, the above-mentioned preset rule may be described as a rule in which "a port-specific ID number" is formed/generated as a decimal number and as a combination of two decimal numbers (i.e., an upper digit in one decimal number and a lower digit in the other decimal number). Further, among the two decimal numbers, the one to be serving as the upper digit of the port-specific ID number is derived from the received ID number, and the other to be serving as the lower digit of the port-specific ID number is derived from the port number of a port (i.e., one of the port P1 to the port P3). The generated ID number is then sent out to the other switches/devices.

Further, the switch 11 sends from each of the ports P1-P3 the generated ID number generated for each of the ports P1-P3 (S140). That is, more practically, the ID assign frame including the port-specific ID number specific to each of the ports P1 to P3 is sent from corresponding one of the port P1, P2, or P3 according to the preset rule (i.e., from a port whose port number is used for the generation of the port-specific ID number).

The ID assign frame sent from the port P1 of the switch 11 is inputted to the port P0 of the switch 12. That is, a "port-specific" ID number of "1" in the ID assign frame is sent specifically from the port P1 of the switch 11 to the switch 12.

The switch 12, just like the switch 11, checks the ID assign indicator in the Ethernet frame received by the port P0 (S210), and performs the first operation and the second operation, when the ID assign indicator is "1."

Therefore, the switch 12 also stores the ID number included in the ID assign frame received by the port P0 as an own ID number in the memory 30 of the switch 12 (S220). Further, the switch 12 also generates the port-specific ID number for the ports other than the port P0 (i.e., for the port P1 and the port P2), by combining (i) the port number of the port P1 or the port P2 and (ii) the received ID number according to the preset rule (S230). Then, the generated ID numbers for the port P1 and the port P2 are respectively sent from the port P1 and the port P2 (i.e., from the port whose number is used to generate the port-specific ID number) (S240).

The ID assign frame that is sent from the port P1 of the switch 12 is received by ECU 21, and the ID assign frame sent from the port P2 of the switch 12 is received by ECU 22.

Each of ECUS 21 and 22 checks the ID assign indicator in the received Ethernet frame. Then, since, in this case, the ID assign frame in the received Ethernet frame is "1," ECUS 21 and 22 respectively determine that the received Ethernet frame is the ID assign indicator, thereby discarding the received Ethernet frame (S310).

By the above-mentioned processes, as shown in FIG. 1, "0" is stored in the memory 30 of the switch 11 as an ID number.

Then, in the switch 11, (I) the ID assign frame that includes "1" as an ID number, specific to a port having the port number "1", is sent from the port P1, and (II) the ID assign frame that includes "2" as an ID number, specific to a port having the port number "2", is sent from the port P2, and (III) the ID assign frame that includes "3" as an ID number, specific to a port having the port number "3", is sent from the port P3. In FIG. 1, the numerical value in a downward arrow shows the "port-specific" ID number in the ID assign frame.

Therefore, the value "1" is stored in the memory 30 of the switch 12 as an ID number, the value "2" is stored in the memory 30 of the switch 13 as an ID number, and the value "3" is stored in the memory 30 of the switch 14 as an ID number.

Then, in the switch 12, the ID assign frame that includes "11" as an ID number is sent from the port P1, and the ID assign frame that includes "12" as an ID number is sent from the port P2.

Further, in the switch 13, the ID assign frame that includes "21" as an ID number is sent from the port P1, and the ID assign frame that includes "22" as an ID number, specific to a port having the port number "2", is sent from the port P2 (by combining the received ID number "2" from the switch 11 and the port number of the port P2).

Further, in the switch 14, the ID assign frame that includes "31" as an ID number is sent from the port P1, and the ID assign frame that includes "32" as an ID number is sent from the port P2.

Then, since the ID assign frame sent from the port P2 of the switch 13 is inputted to the port P0 of the switch 15, and the value "22" is stored in the memory 30 of the switch 15 as an ID number.

Further, in the switch 15, the ID assign frame that includes "221" as an ID number, specific to a port having the port number "1", is sent from the port P1, and the ID assign frame that includes "222" as an ID number, specific to a port having the port number "2", is sent from the port P2 (as a result of the received ID number "22" and the port number of "1" or "2").

Therefore, the value "221" is stored in the memory 30 of the switch 16 as an ID number, and the value "222" is stored in the memory 30 of the switch 17 as an ID number.

Further, in the switch 16, the ID assign frame that includes "2211" as an ID number is sent from the port P1. Further, in the switch 17, the ID assign frame that includes "2221" as an ID number is sent from the port P1.

Further, even when each of ECUS 21-27 will receive the ID assign frame from the switch in a higher hierarchy, since the received frame will be the ID assign frame in each of ECUS 21-27, the received frame will be discarded.

[Effects of the Present Embodiment]

According to the above-mentioned switches 11-17, the switches 11-17 are respectively enabled to receive a dynamically-assigned unique ID number when the switches 11-17 are arranged to form the hierarchical type communication network 1 as shown in FIG. 1 (i.e., a dynamic assignment of an ID number to each of the switches 11-17 is enabled). For enabling such an ID assignment scheme of the present embodiment, only a frame identification function (S110 or S210) and a first and second operation performing function (S120-S140, or S220-S240) are added to a layer-2 switch. Therefore, in other words, an IP routing function of the layer-3 switch is not required.

Further, the switches 11-17 respectively generate the ID number that is sent from the port of the own switch according to the above-mentioned preset rule, the ID number assigned to each of the switches 11-17 is intuitively understood/predictable.

Further, according to the present embodiment, any device in the communication network 1 can send an instruction to each of the switches 11-17 by using the ID numbers respectively stored in the switches 11-17, for an execution of a certain process in any one of the switches 11-17, for example. The certain process sent as an instruction to each of the switches 11-17 may be, for example, a configuration re-writing, a reading of fault information, a transition to a power-save mode, and the like. The configuration re-writing may be a re-writing of any setting of the functions in the respective switches 11-17. More practically, the configuration re-writing may be performed, for example, about an auto-negotiation function being turned ON or OFF, a type of error information to be memorized, an enable/disable of the power-save mode and the like.

[Example Instruction to Execute a Process in Each of the Switches]

Since an in-vehicle environment is static, the ID number to be stored in each of the switches 11-17 in the communication network 1 by the first operation and the second operation described above is logically predictable in advance.

Therefore, the master ECU 20 may be configured, for example, to store an ID table that shows a relationship between the switches 11-17 and the ID numbers in the communication network 1, as shown in FIG. 4. The master ECU 20 may, for example, search for an ID number of each of the switches 11-17 with reference to such an ID table.

Then, the master ECU 20 performs the following operation, for example, when instructing any of the switches 11-17 to perform a desired process.

The master ECU 20 includes, in the data area of the Ethernet frame that is sent to all devices in the communication network 1, (i) an ID number of a destination switch by which a desired process is executed and (ii) a command indicating the contents of the desired process to be executed by the destination switch when the ECU 20 generates a process instruction frame. Then, the master ECU 20 inputs the generated process instruction frame to the port P0 of the switch 11, for example, for sending the process instruction frame to all devices.

On the other hand, each of the switches 11-17 may be configured to perform the following operation. That is, when the received Ethernet frame received by one of the switches 11-17 includes, in the data area, (i) the above-described command and (ii) the same ID number that is stored in the memory 30 of the switch receiving the Ethernet frame, the destination switch (i.e., one of the switches 11-17 receiving the Ethernet frame) executes the process indicated by the received command.

[Other Embodiment 1]

The rule for generating the ID number to be sent from the port of the switches 11-17 may be formed as a different rule such as "adding, (i.e., appending as lower (i.e., "least significant") bits), a certain number of bits in a binary number representing the port number (e.g., four bits) to a series of bits in a binary number representing the received ID number".

[Other Embodiment 2]

The master ECU 20 may be a device outside of the vehicle (e.g., a fault diagnosis device/terminal). In such case, the lower hierarchy devices in the hierarchies lower than the master ECU 20 (i.e., the devices in the second hierarchy and in subsequent hierarchies), constitute the in-vehicle communication network.

Although the present disclosure has been described in connection with preferred embodiment thereof with reference to the accompanying drawings, it is to be noted that various changes and modifications will become apparent to those skilled in the art.

For example, a function in one component in the above-described embodiments may be distributed to plural components, or a function realized by plural components in the above-described embodiments may be aggregated to only one component. Further, a part of the component in the above-described embodiments may be replaced with a well-known component having the same function. Further, the technique represented by the language of the claims may take various forms in a non-limiting manner.

Further, the present disclosure may be realized as, besides being embodied as the switches 11-17 and the communication network 1, a program stored in the non-transitive memory media for controlling a computer as the switches 11-17, or as a method for assigning the ID number to switching hubs or the like.

Such changes and modifications are to be understood as being within the scope of the present disclosure as defined by appended claims.

What is claimed is:

1. A switching hub serving as a component of a hierarchical communication network in a vehicle, the switching hub comprising:
   a memory;
   a specific port; and
   an other port other than the specific port, wherein
   the switching hub is configured to communicate with a plurality of other switching hubs and electronic control units using an Ethernet standard,
   store an identification (ID) number included in an Ethernet frame received from a master electronic control unit by the specific port as an identifier of the switching hub into the memory,
   generate a port-specific ID number for the other port based on a port number of the other port and the ID number, and
   send from the other port an ID assign frame including the port-specific ID number to at least one of the plurality of other switching hubs and electronic control units,
   wherein the ID number and the port number are decimal numbers, and
   the port-specific ID number is generated according to a preset rule by forming a decimal port-specific ID number as a combination of an upper digit and a lower digit, the lower digit of the port-specific ID number being the port number, and the upper digit of the port-specific ID number being the ID number.

2. A communication network in a vehicle, the communication network formed hierarchically by a plurality of the switching hub of claim 1.

3. The communication network of claim 2 further comprising: a master device instructing the switching hub in the hierarchical communication network to perform a preset process based on the ID number stored in the memory of the switching hub.

4. An Ethernet-based vehicle communication network comprising:
   a first hierarchy Ethernet switch including a first input port, a first memory, and a first output port;
   a second hierarchy Ethernet switch disposed within a vehicle, the second hierarchy Ethernet switch including a second input port, a second memory, and a second output port; and
   a communication line connecting the first output port to the second input port, wherein the first hierarchy Ethernet switch is configured
   to receive at the first input port a first Ethernet frame having an ID assign instruction and a first ID number from a master electronic control unit,
   to store the first ID number in the first memory,
   to generate a second ID number associated with the first output port, and to output from the first output port a second Ethernet frame comprising a first decimal number having the first ID number as an upper digit and the second ID number as a lower digit, and wherein
   the second hierarchy Ethernet switch is configured
   to receive at the second input port the second Ethernet frame,
   to store the first and second ID numbers into the second memory, to generate a third ID number associated with the second output port, and
   to output from the second output port a third Ethernet frame comprising a second decimal number, wherein the second decimal number concatenates the first decimal number as upper digits with the third ID number as the lowest digit.

* * * * *